(12) United States Patent
López Ezquerro

(10) Patent No.: US 11,326,582 B2
(45) Date of Patent: May 10, 2022

(54) BEACON ILLUMINATION DEVICE AND WIND TURBINE COMPRISING THE DEVICE

(71) Applicant: ADWEN OFFSHORE, S.L., Zamudio (ES)

(72) Inventor: Javier López Ezquerro, Navarra (ES)

(73) Assignee: ADWEN OFFSHORE, S.L. (ES)

( * ) Notice: Subject to any disclaimer, the term of this patent is extended or adjusted under 35 U.S.C. 154(b) by 0 days.

(21) Appl. No.: 16/621,058

(22) PCT Filed: Jun. 29, 2018

(86) PCT No.: PCT/ES2018/070470
§ 371 (c)(1),
(2) Date: Dec. 10, 2019

(87) PCT Pub. No.: WO2019/008205
PCT Pub. Date: Jan. 10, 2019

(65) Prior Publication Data
US 2020/0158093 A1     May 21, 2020

(30) Foreign Application Priority Data

Jul. 7, 2017   (ES) .............................. ES201730909

(51) Int. Cl.
*F21V 7/04* (2006.01)
*F03D 80/10* (2016.01)
(Continued)

(52) U.S. Cl.
CPC ........... *F03D 80/10* (2016.05); *G02B 6/0006* (2013.01); *G02B 6/0008* (2013.01); *G02B 27/30* (2013.01)

(58) Field of Classification Search
CPC ........... F03D 80/10; F03D 80/30; G08B 5/00; Y02B 10/30; G02B 6/0008; G02B 27/30;
(Continued)

(56) References Cited

U.S. PATENT DOCUMENTS 3,723,722 A * 3/1973 Van Iderstine ......... B64C 27/00
                                                362/470
5,690,408 A * 11/1997 de la Pena ........... B60Q 1/0011
                                                362/470
(Continued)

FOREIGN PATENT DOCUMENTS

CN          2694898 Y     4/2005
CN          1924635 A     3/2007
(Continued)

OTHER PUBLICATIONS

International Search Report dated Oct. 15, 2018 for PCT/ES2018/070470.

*Primary Examiner* — Omar Rojas Cadima
(74) *Attorney, Agent, or Firm* — Schmeiser, Olsen & Watts LLP

(57) ABSTRACT

Provided is a beacon illumination device for signaling the presence of a wind turbine to aircraft, including an illuminator device having at least one light-emitting diode, at least one beacon light that can be mounted on an end part of the wind turbine at a distance from the illuminator device, at least one light conductor having optical fibers for transmitting light from the illuminator device to the beacon light, with the optical fibers being grouped in at least one bundle of optical fibers, with the illuminator device also having an optical collimator with at least one collimator lens disposed between the light inlet of the optical fibers and the light-emitting diode, for converting scattered light emitted by the light-emitting diode into a parallel beam of light and transmitting same towards the light inlet of the optical fibers.

16 Claims, 8 Drawing Sheets

(51) Int. Cl.
 *F21V 8/00* (2006.01)
 *G02B 27/30* (2006.01)
(58) Field of Classification Search
 CPC .... G02B 6/0006; G02B 6/0096; G02B 6/262;
 G02B 3/08; G02B 6/003; G02B 6/0031;
 G02B 6/4204; F21Y 2115/10; F21V
 2200/40; F21V 13/04; Y02E 10/72;
 F21W 2111/00; F21W 2111/06
 See application file for complete search history.

(56) References Cited

U.S. PATENT DOCUMENTS

| | | | | |
|---|---|---|---|---|
| 6,086,234 | A * | 7/2000 | Riser | F21V 7/04 |
| | | | | 362/327 |
| 6,641,366 | B2 * | 11/2003 | Nordhoff | F03D 80/10 |
| | | | | 416/5 |
| 2002/0102161 | A1 | 8/2002 | Nordhoff | |
| 2003/0223868 | A1* | 12/2003 | Dawson | F03D 7/0236 |
| | | | | 416/1 |
| 2004/0041409 | A1* | 3/2004 | Gabrys | F03D 80/70 |
| | | | | 290/55 |
| 2006/0002791 | A1* | 1/2006 | Moroz | F03D 7/0264 |
| | | | | 416/1 |
| 2006/0012842 | A1 | 1/2006 | Abu-Ageel | |
| 2008/0192460 | A1* | 8/2008 | Wobben | F03D 80/10 |
| | | | | 362/145 |
| 2009/0136178 | A1 | 5/2009 | Pirastu | |
| 2009/0202351 | A1* | 8/2009 | Rodriguez Sola | F03D 80/10 |
| | | | | 416/146 R |
| 2009/0279323 | A1* | 11/2009 | Foote | F03D 80/10 |
| | | | | 362/582 |
| 2010/0194603 | A1 | 8/2010 | Wobben | |
| 2013/0170004 | A1 | 7/2013 | Futterer | |
| 2015/0135858 | A1* | 5/2015 | Okano | G01B 7/003 |
| | | | | 73/862.68 |
| 2015/0304027 | A1 | 10/2015 | Nciri | |
| 2015/0371575 | A1* | 12/2015 | Carl | G09G 3/14 |
| | | | | 416/5 |
| 2016/0169501 | A1 | 6/2016 | Cryan et al. | |

FOREIGN PATENT DOCUMENTS

| | | | | |
|---|---|---|---|---|
| CN | 101133282 A | 2/2008 | | |
| CN | 101178165 A | 5/2008 | | |
| CN | 101326456 A | 12/2008 | | |
| CN | 101384817 A | 3/2009 | | |
| CN | 101514676 A | 8/2009 | | |
| CN | 101529288 A | 9/2009 | | |
| CN | 102313992 A | 1/2012 | | |
| CN | 102384418 A | 3/2012 | | |
| CN | 103080852 A | 5/2013 | | |
| CN | 103676186 A | 3/2014 | | |
| CN | 104380065 A | 2/2015 | | |
| CN | 204731497 U | 10/2015 | | |
| DE | 20103294 U1 | 9/2001 | | |
| DE | 10256365 A1 * | 7/2003 | ......... | G02B 6/0006 |
| ES | 2353320 A1 | 3/2011 | | |
| ES | 2387364 | 9/2012 | | |
| ES | 2387364 A1 | 9/2012 | | |
| JP | H11133273 A | 5/1999 | | |
| JP | 2010270623 A * | 12/2010 | | |
| WO | WO03050412 | 6/2003 | | |
| WO | WO03050412 A1 | 6/2003 | | |
| WO | WO 03104648 A1 | 12/2003 | | |
| WO | WO2007068254 | 6/2007 | | |
| WO | WO2007068254 A1 | 6/2007 | | |

* cited by examiner (A-A)

(B-B)

(C-C)

(D-D)

BEACON ILLUMINATION DEVICE AND WIND TURBINE COMPRISING THE DEVICE

CROSS-REFERENCE TO RELATED APPLICATIONS

This application claims priority to PCT Application No. PCT/ES2018/070470, having a filing date of Jun. 29, 2018, which is based on ES Application No. P201730909, having a filing date of Jul. 7, 2017, the entire contents both of which are hereby incorporated by reference.

FIELD OF TECHNOLOGY

The following relates to a beacon illumination device of the type used to signal the presence of a wind turbine to aircraft. It is of use in the field of safety in the air and of construction, and the maintenance of wind turbines and other buildings.

The following further relates to a wind turbine that comprises the illumination device.

BACKGROUND

For safety reasons, all constructions above a certain height have to include beacon illumination signaling their position to approaching aircraft. In the case of wind turbines, these lights are required to stand out brightly against the rest of the terrain and must frequently be located on the crest of hills or mountains. In addition, beacon illumination of wind turbines and other very high constructions is usually exposed to the impact of electric rays that may cause the destruction of the electrical part of the beacon illumination, resulting in the need for repair or replacement thereof.

Wind turbine blades, where the highest point of the wind turbine changes as the blades turn therefore have to carry beacon illumination (for example, in accordance with the German regulations, four 5 W or more lights at the tip and at a second height), which means that there is a need to install a power supply and illumination on all the blades, and this situation is exacerbated by the fact that beacon illumination is customarily positioned very close to the lightning arrestor of the blade. The German company Enertrag Windfeld Systemtechnik GmbH designed a system in which the beacon illumination, arranged in an end part of the blade of the wind turbine, which comprises a block of acrylic material in which are embedded high-power LEDs arranged in an aluminum support and each connected to a driver, is connected by means of an electrical conductor cable to an electricity power supply source located in the root of the blade of the wind turbine. However, in the event of lightning strike, the electrical energy from the lightning also leaks to the electrical conductor cable, in addition to the fact that the electronic components present in the beacon illumination may attract lightning, notwithstanding their being embedded in a block of acrylic material.

In an attempt to mitigate these problems, patent application ES2353320A1, from the Spanish company Gamesa Innovation & Technology, S.L., describes a beacon device that comprises a luminous beacon based on LEDs arranged in the region of the tip of a blade of a wind turbine, a converter that converts luminous energy into electrical energy also arranged adjacent the luminous beacon, and an optical fiber cable connected to the converter and to a laser light emitter arranged in the zone of the root of the blade. Although this system does not generate the aforementioned problems of the electrical conductor cable, the conversion of the luminous energy into electrical energy that takes place does not actually make it possible to achieve the necessary power for correct beacon illumination and, in addition, the converter and the LED driver are formed by electronic circuits that, as well as attracting lightning, are arranged in the vicinity of the lightning arrestor of the blade and may be destroyed in the event of lightning strike.

Application WO03050412A1 describes a beacon illumination device, for signaling the presence of a blade of a wind turbine to aircraft, that comprises an illuminator device that comprises at least one light-emitting diode or a laser light source arranged inside the blade or the hub of the rotor of the wind turbine and at least one beacon light arranged in the tip of the blade. The light generated by the illuminator device is transmitted to the beacon light by means of optical fiber cables used as light conductors. The illuminator device faces a light inlet end of the optical fiber cable, while the beacon light is connected to a light outlet end of the optical fiber cable. There is no description of how it is possible to arrive at the situation in which the beacon light has sufficient intensity to be able to fulfil its illumination function that alerts nearby aircraft to the presence of the blades of the wind turbine, since it mentions only that the light exiting the outlet end of the optical fiber may be connected to a light receiving diode.

It was therefore desirable to develop a safe, simple device which is also easy to maintain and that guarantees the correct functioning of the beacon illumination.

SUMMARY

An aspect relates to a device for signaling the presence of a wind turbine to aircraft and a wind turbine that comprises the beacon illumination device.

The beacon illumination device comprises an illuminator device that comprises at least one light-emitting diode capable of being arranged in an interior part of the wind turbine, at least one beacon light capable of being mounted at an end part of the wind turbine in a position at a distance from the illuminator device, at least one light conductor that comprises optical fibers for transmitting light from the illuminator device to the beacon light, the illuminator device facing light inlet ends of the optical fibers and each optical fiber comprising a light outlet end, wherein the optical fibers are grouped in at least one bundle of optical fibers, the illuminator device further comprises an optical collimator that comprises at least one collimator lens arranged between the light inlet of the optical fibers and the light-emitting diode, for converting scattered light emitted by the light-emitting diode into a parallel light beam and transmitting same toward the light inlet of the optical fibers.

The beacon light may comprise an optical diffuser arranged at the light outlet end of the optical fibers of the bundle of optical fibers, and preferably comprises a diffuser optical lens.

The optical collimator may comprise a concave reflector that directs the scattered light emitted by the light-emitting diode toward the collimator optical lens.

In one embodiment of the invention, the bundle of optical fibers comprises a principal trunk and at least one branch deriving from the principal trunk. Each branch comprises at least one optical fiber originating from the principal trunk, the light outlet ends of the optical fibers of the principal trunk and of each branch are connected to respective beacon lights.

The illuminator device may comprise a plurality of light-emitting diodes. In this case, the illuminator device may comprise a concave reflector that directs the scattered light emitted by the plurality of light-emitting diodes toward the collimator lens of the optical collimator.

The wind turbine according to embodiments of the invention comprises a tower, a nacelle mounted on an upper part of the tower, a hub on which is mounted at least one blade, and an electrical machine connected to the hub and housed in the nacelle, and also one beacon illumination device comprises an illuminator device that comprises at least one light-emitting diode capable of being arranged in an interior part of the wind turbine, at least one beacon light capable of being mounted on an end part of the wind turbine in a position at a distance from the illuminator device, and at least one light conductor that comprises optical fibers for transmitting light from the illuminator device to the beacon light, the illuminator device facing light inlet ends of the optical fibers and each optical fiber comprising a light outlet end, wherein the optical fibers are grouped in at least one bundle of optical fibers, the illuminator device further comprises an optical collimator that comprises at least one collimator lens arranged between the light inlet of the optical fibers and the light-emitting diode, for converting scattered light emitted by the light-emitting diode into a parallel light beam and transmitting same toward the light inlet of the optical fibers.

The optical collimator may comprise a concave reflector that directs the scattered light emitted by the light-emitting diode toward the collimator optical lens.

In one embodiment of the wind turbine, each of the blades thereof comprises a root that is connected to the hub, a tip, a leading edge, a trailing edge and a shell that constitutes an exterior covering of the blade, and it comprises at least one beacon light in an end part of each blade, close to the tip of each blade. The beacon lights are connected to at least one illuminator device arranged inside the hub by means of respective bundles of optical fibers such that it turns with the hub, and each bundle of optical fibers extends internally through the blade such that the light outlet ends of the optical fibers are in contact with a part of the beacon light.

Each beacon light is connected via the bundle of optical fibers to a single illuminator device.

Each blade may comprise a principal beam that in turn comprises a front wall facing the leading edge of the blade and extends between the root and the tip of the blade. On the front wall of the principal beam is arranged a guide profile that guides the bundle of optical fibers toward the beacon light.

In one embodiment, the beacon light may comprise a diffuser lens mounted on a fitting that is mounted in the shell of the blade. This fitting comprises a rear tubular extension that traverses the shell. The optical fibers are secured inside the rear tubular extension such that their light outlet ends are in contact with the diffuser lens.

In another embodiment, the beacon light comprises a light diffuser cover arranged, in a zone of the tip of the blade, externally on the shell. The optical fibers traverse the shell of the blade toward the exterior and are embedded in a resin layer applied between the shell and the light diffuser cover such that the light outlet ends of the optical fibers are in contact with the light diffuser cover, forming points of light that are diffused by the light diffuser cover.

In a subsequent embodiment, the shell of the blade comprises a transparent part in a part of the tip of the blade, and the outlet ends of the optical fibers of the bundle of optical fibers are connected to an optical diffuser positioned inside the blade such that the light exiting the optical diffuser is projected to the exterior of the blade (5) via the transparent part.

Alternately, or to complement the presence of the beacon lights on the blades of the wind turbine, there may also be a plurality of beacon lights distanced from one another over the periphery of the tower of the wind turbine and connected by means of respective bundles of optical fibers to the at least one illuminator device. Each beacon light may be connected via the bundle of optical fibers to a single illuminator device.

According to a first embodiment of the wind turbine, each beacon light comprises a diffuser lens mounted on a fitting that is mounted on the wall of the tower. This fitting comprises a rear tubular extension that traverses the wall, and the optical fibers are secured inside the rear tubular extension such that their light outlet ends are in contact with the diffuser lens.

BRIEF DESCRIPTION

Some of the embodiments will be described in detail, with references to the following Figures, wherein like designations denote like members, wherein.

Figure 1:
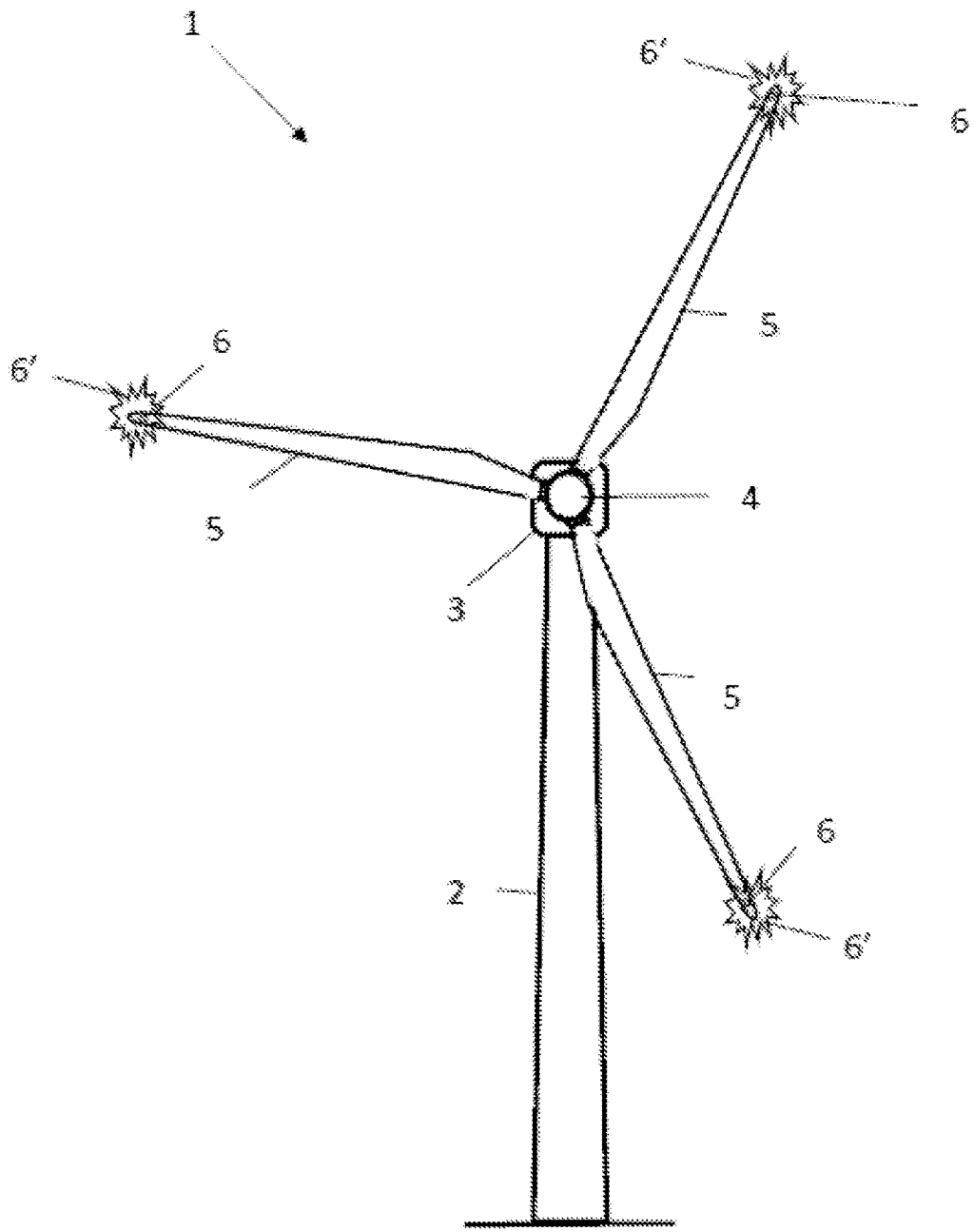
FIG. 1 is a view in front elevation of a wind turbine incorporating the illumination device according to embodiments of the invention.

Reference signs appear in these figures, identifying the following elements:
1 wind turbine
2 tower
2*a* wall
3 nacelle
4 hub
5 blade 5a root of the blade
5b tip of the blade
5c leading edge
5d trailing edge
5e principal beam
5f shell
6 beacon light
6' beacon illumination
6a diffuser lens
6b fitting
6c rear tubular extension
6d light diffuser cover
6e adhesive resin layer
6f light tip
6g transparent part
6h optical diffuser
7 illuminator device
7a light-emitting diode
7b optical collimator
7c collimator lens
7d concave reflector
7e electrical power supply device
7f electrical connection lines
7g heat dissipator
7h casing
8 bundle of optical fibers
8a optical fibers
9 securing element
10 grouping element
11 guide profile
12 lightning arrestor
12a protective profile

DETAILED DESCRIPTION

A brief description is given below of embodiments of the invention, as an illustrative, non-limiting example thereof.

FIG. 1 shows a wind turbine -1-, which is conventional per se, which incorporates an embodiment of the beacon illumination device according to embodiments of the invention.

The wind turbine -1- comprises a tower -2-, a nacelle -3- mounted on the upper part of the tower -2-, a hub -4- in which three blades -5- are mounted, and an electrical machine connected to the hub -4- and housed in the nacelle -3-. In the zone of the tip of each blade, there is a beacon light -6- that emits a beacon illumination -6'- to signal the presence of the wind turbine -1- to aircraft.

Figure 2:
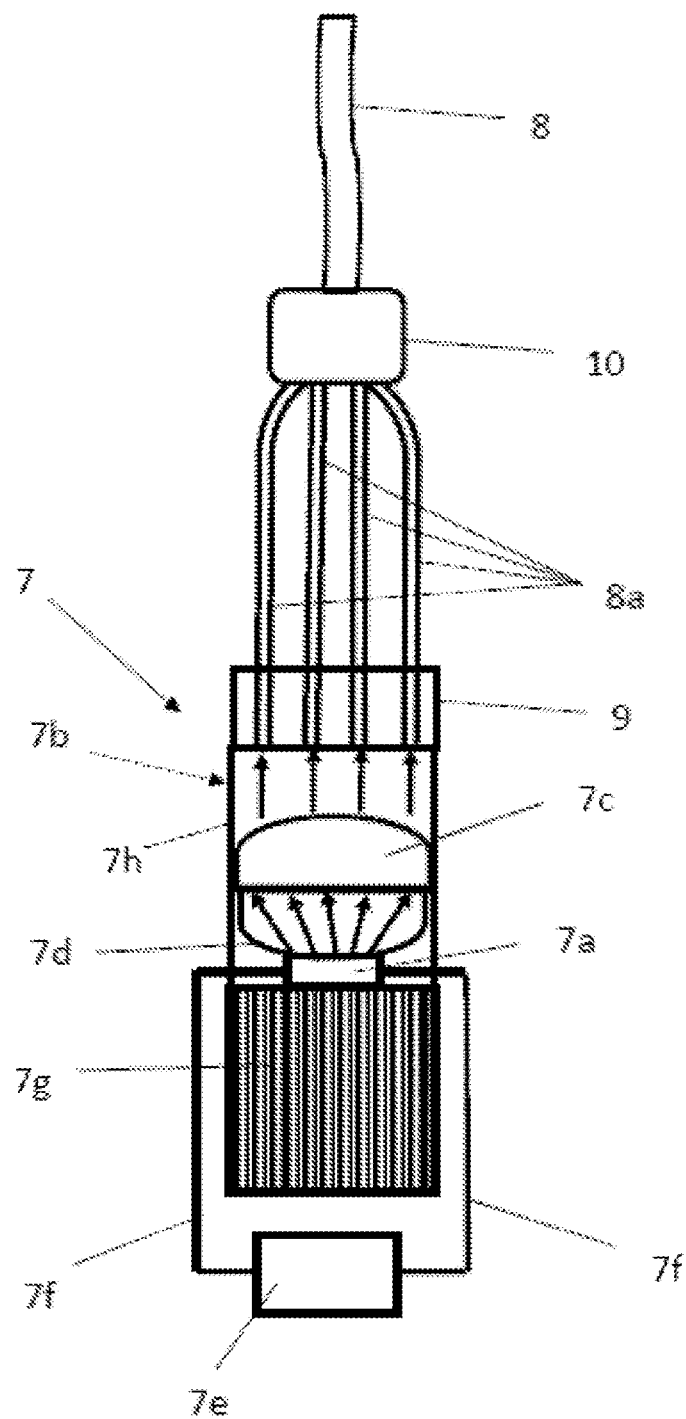
FIG. 2 is a view of an embodiment of an illuminator device according to embodiments of the invention.

FIG. 2 illustrates an embodiment of an illuminator device -7- according to embodiments of the invention which is capable of being arranged in an interior part of the wind turbine and can be connected to the beacon light (not shown in FIG. 2) by means of a light conductor that comprises optical fibers -8a-, for transmitting light from the illuminator device -7- to the beacon light.

The illuminator device -7- faces the light inlet ends of the optical fibers -8a- and comprises a light-emitting diode -7a-, an optical collimator -7b-that comprises a collimator lens -7c-arranged between the light inlet of the optical fibers -8a- and the light-emitting diode -7a-, and a concave reflector -7d-.

The light-emitting diode -7a-is connected, by means of electrical lines -7f-, to an electrical power supply device -7e-("driver"), which is conventional per se, which is in turn connected to an electrical energy source (not shown in FIG. 2). To avoid overheating and to stabilize the temperature of the light-emitting device -7a-, it is mounted on a heat dissipator -7g-.

The light-emitting diode -7a-, the concave reflector -7d- and the collimator lens -7c-are mounted in a casing -7h-, the interior surface of which reflects light at least between the collimator lens -7c- and the light inlets of the optical fibers -8a-.

The concave reflector -7d-directs the scattered light emitted by the light-emitting diode -7a-toward the collimator lens -7c-, which in turn converts the scattered light originating from the light-emitting diode -7a-into a parallel light beam that is transmitted toward the light inlet of the optical fibers -8a-.

The ends of the optical fibers -8a-where the light inlets thereof are located are secured to a securing element -9- that closes the end of the casing -7h-opposite the collimator lens -7c-, such that the light inlets are arranged in alignment with the parallel light beam generated by the collimator lens -7c-.

The optical fibers -8a-that exit the securing element -9- enter a grouping element -10- in which the optical fibers -8a-are brought together such as to be grouped in a bundle -8- of optical fibers. A number of optical fibers -8a-may in turn be grouped as respective optical fiber cables (not shown in the figures), which are in turn grouped as the bundle (8) of optical fibers.

Figure 3:
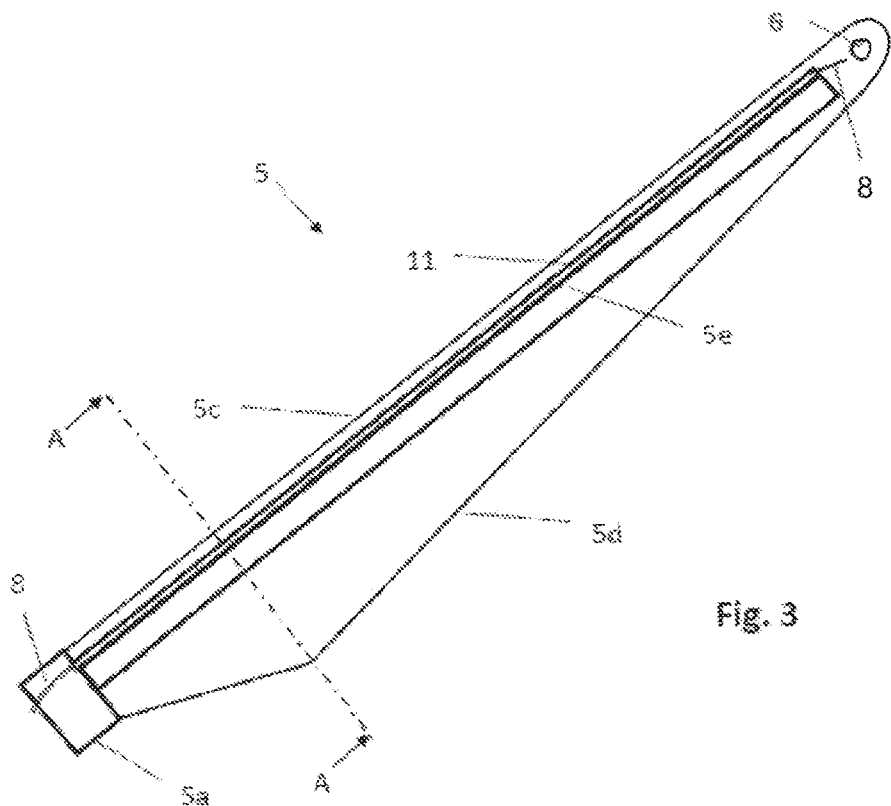
FIG. 3 is a sectioned plan view of a wind turbine blade incorporating the beacon light according to embodiments of the invention.
Figure 4:
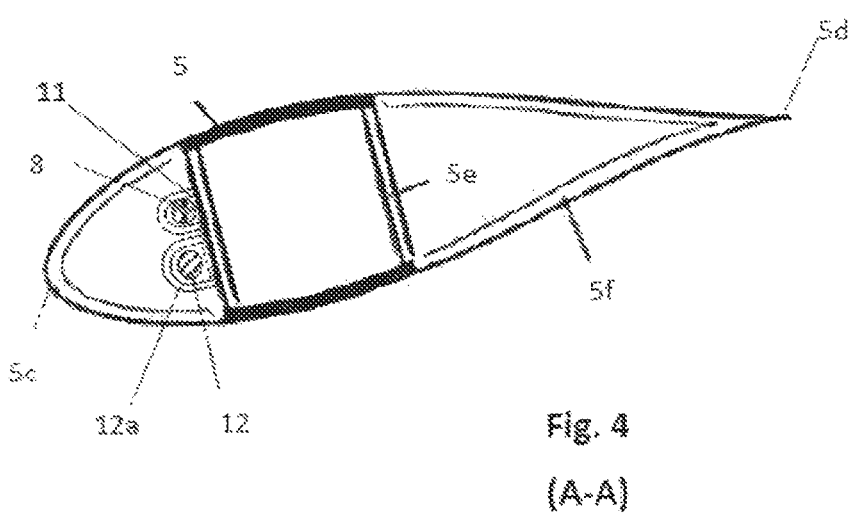
FIG. 4 is a sectional view on line A-A, which appears in FIG. 3.

FIGS. 3 and 4 show a wind turbine blade -5- on which is arranged a bundle of optical fibers connected to a beacon light -6-, such as that shown in FIG. 1, according to an embodiment of the invention.

The blade -5- comprises, in a manner that is conventional per se, a root -5a-that is connected to the hub, a tip -5b-of the blade, a leading edge -5c-, a trailing edge -5d-, a principal beam -5e-that extends between the root -5a- and the tip -5b-of the blade -5-, and a shell -5f-that constitutes the exterior cover of the blade -5-.

On the wall of the principal beam -5e-facing the leading edge -5c-of the blade -5- are arranged a guide profile -11- and a protective profile -12a-. Via the protective profile -12a-extends a lightning conductor -12- that connects a lightning arrestor (not shown in the figures) located on the tip -5b-of the blade and a ground connection (not shown in the figures) arranged on the tower of the wind turbine.

Figure 10:
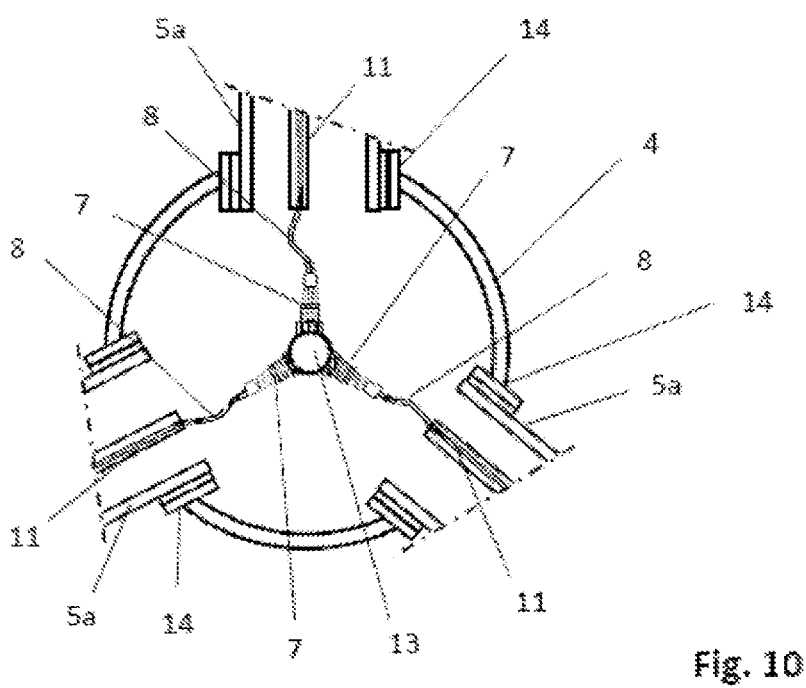
FIG. 10 is a view in rear elevation of a rotor of a wind turbine that houses an illuminator device according to another embodiment of the invention.

The beacon light -6- is located in a zone of the tip -5b-of the blade and is connected to the bundle -8- of optical fibers that extends via the guide profile -11- through the interior of the root -5a-of the blade toward, as may be seen in FIG. 10, the illuminator device -7- that is arranged inside the hub -4-.

Figure 5:
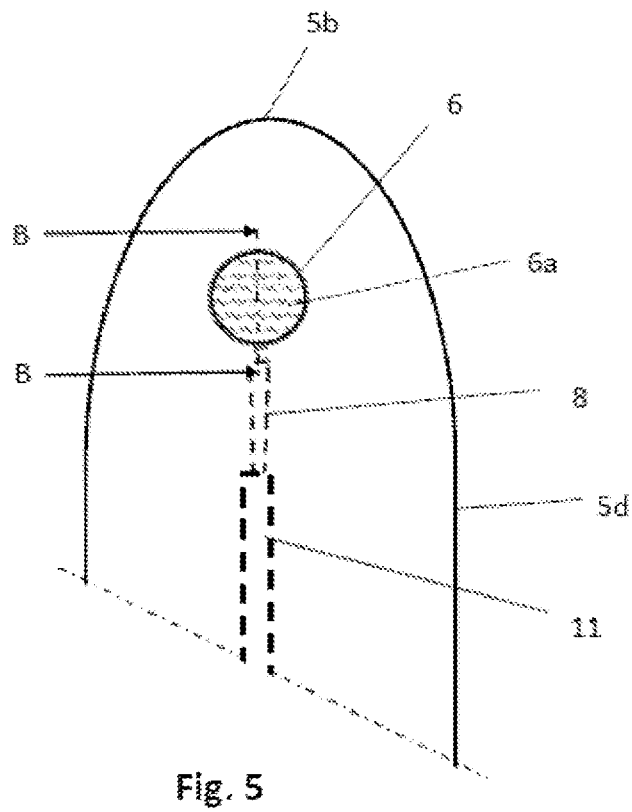
FIG. 5 is an upper plan view of the exterior end part of the blade illustrated in FIG. 3.
Figure 6:
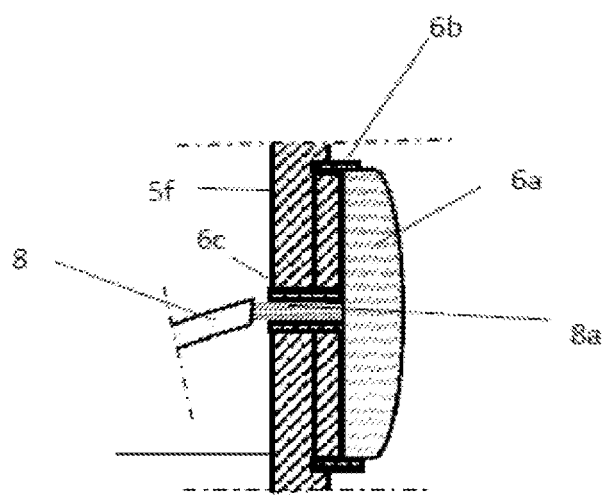
FIG. 6 is a sectional view on the line B-B, which appears in FIG. 3.

FIGS. 5 and 6 illustrate in greater detail the arrangement of the beacon light -6- shown in FIG. 6 in the zone of the tip -5b-of the blade. The beacon light -6- comprises a diffuser lens -6a-mounted on a fitting -6b-that is mounted on the shell -5f-of the blade. The fitting -6b-comprises a rear tubular extension -6c-that traverses the shell -5f-. The optical fibers -8a-are secured inside the rear tubular extension -6c-such that their light outlet ends are in contact with the diffuser lens -6a-.

Figure 7:
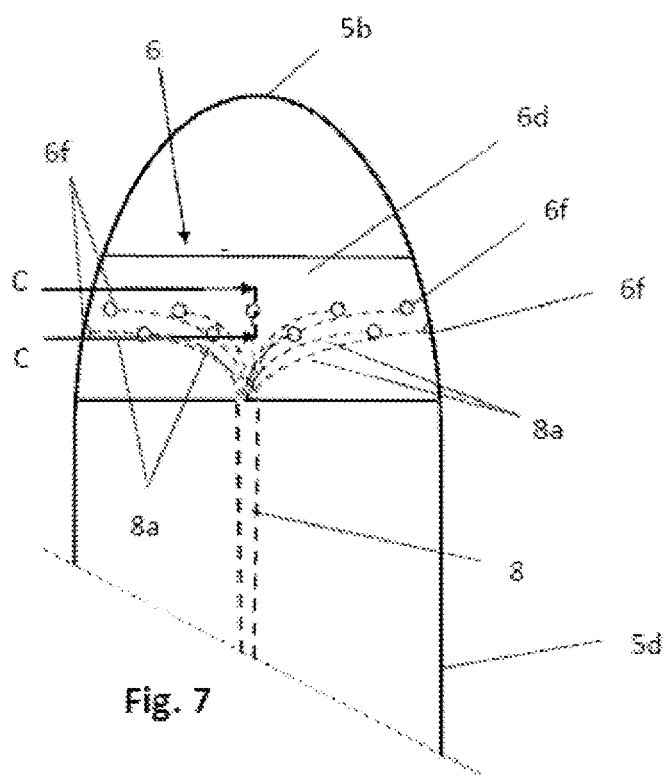
FIG. 7 is an upper plan view of the exterior end part of a wind turbine blade with a beacon light according to one more embodiment of the invention.
Figure 8:
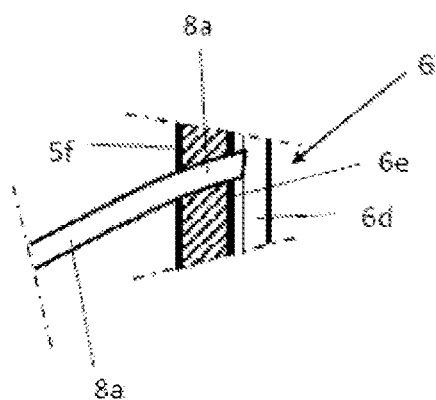
FIG. 8 is a sectional view on line C-C, which appears in FIG. 7.

FIGS. 7 and 8 show another embodiment of the beacon light -6-, in which it comprises a light diffuser cover -6d-adhesively bonded, in a zone of the tip -5b-of the blade, to the exterior of the shell -5f-by means of an adhesive resin layer -6e-. The optical fibers -8a-traverse the shell -5f-of the blade toward the exterior and are embedded in the resin layer -6e-such that the light outlet ends thereof are in contact with the light diffusor cover -6d-, forming points of light -6f-that are diffused by the light diffuser cover -6d-.

Figure 9:
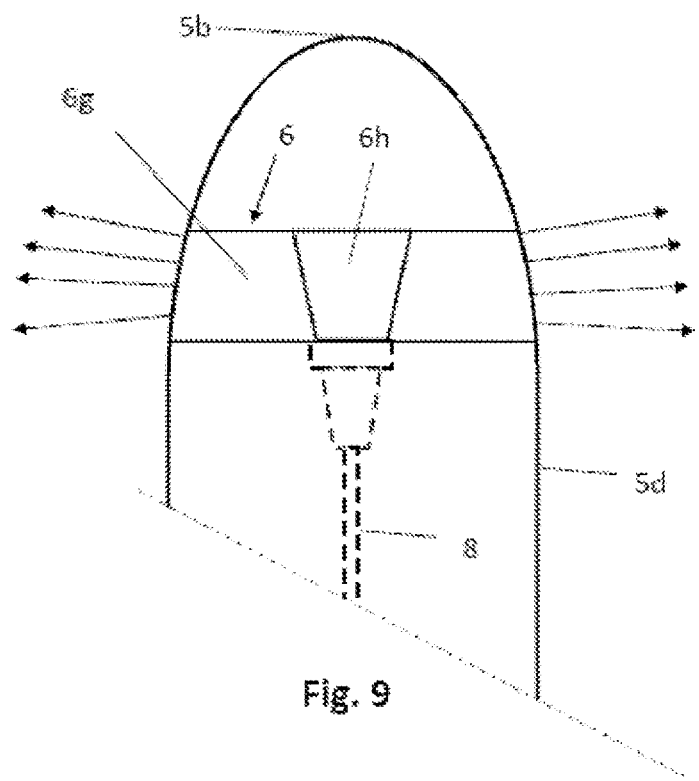
FIG. 9 is an upper plan view of the exterior end part of a wind turbine blade with a beacon light according to a subsequent embodiment of the invention.

FIG. 9 shows another embodiment of the beacon light -6-, in which the shell of the blade comprises a transparent part -6g-, for example a part made from methacrylate, in the part of the tip -5b-of the blade. The outlet ends of the optical fibers of the bundle -8- of optical fibers are connected to an optical diffuser -6h-located inside the blade, such that the light exiting the optical diffusor -6h-is projected to the exterior via the transparent part -6g-.

FIG. 10 shows the arrangement of the illuminator devices -7- that generate the light transmitted via the bundles -8- of optical fibers to the beacon lights -6- located in the zone of the tip -5b-of the blade -5-, according to the embodiments shown in FIGS. 1, 3-4, 5-6, 7-8 and 9.

It may be seen that the illuminator devices -7- are arranged in a support element -13- inside the hub -4- such that they turn with the hub -4-. The roots -5a-of the blades are connected to the hub -4-, in a manner that is conventional per se, by means of respective adjustment mechanisms -14- that allow individual turning of the position of each blade with respect to the incident wind. The bundles -8- of optical fibers respectively exiting the illuminator devices -7- enter the respective guide profiles -11- described above with reference to FIG. 2.

Figure 11:
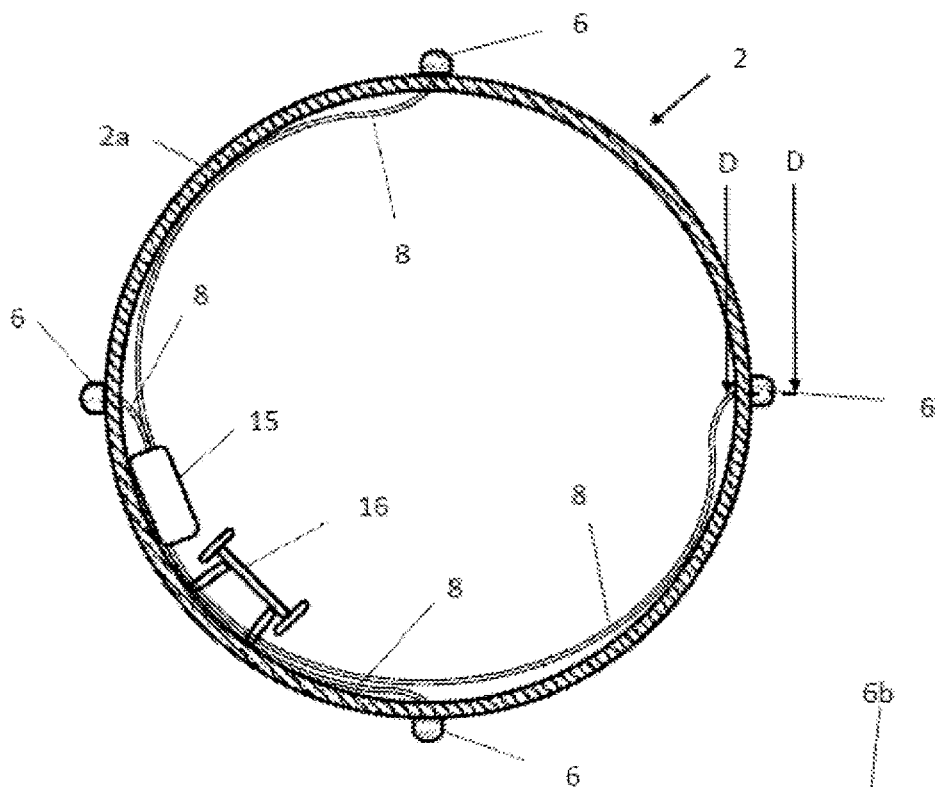
FIG. 11 is a horizontal sectional view of a wind turbine tower in which the illumination device is arranged, according to a subsequent embodiment of the invention.
Figure 12:
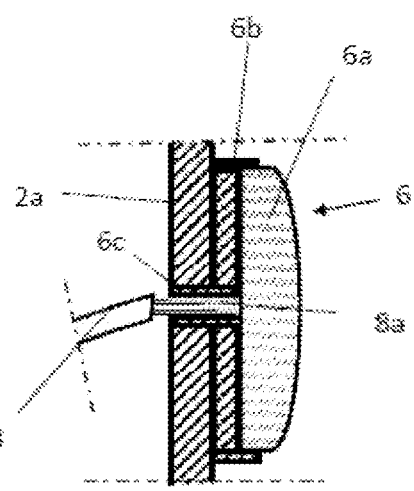
FIG. 12 is a sectional view on line D-D, which appears in FIG. 11.
Figure 13:
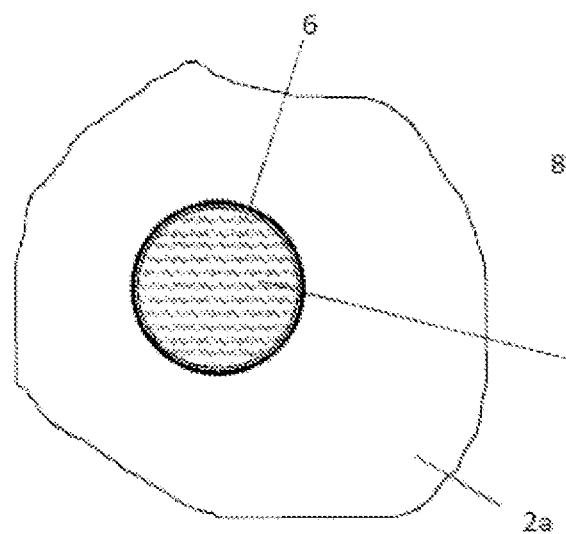
FIG. 13 is a view in front elevation of one of the beacon lights shown in FIG. 11.
Figure 14:
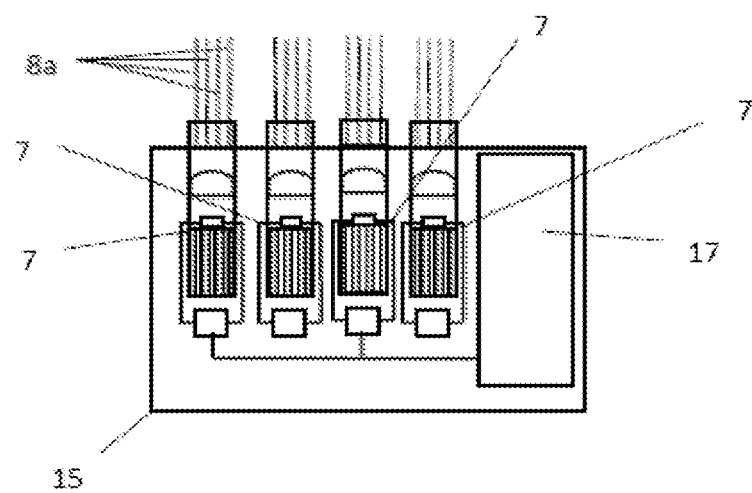
FIG. 14 is a view in elevation of the illuminator device for the embodiment of the illumination device shown in FIG. 11.

FIGS. 11-13 illustrate an embodiment in which the beacon illumination device according to embodiments of the invention is applied to beacon lights -6- arranged on the tower -2- of a wind turbine of the type as shown in FIG. 1. In the embodiment illustrated in these figures, the illumination device comprises four beacon lights -6- located in an equidistant manner over the periphery of the tower -2- and connected by means of respective bundles -8- of optical fibers to a control cabinet -15- housing respective illuminator devices -7- such as those described previously with reference to FIG. 2, and also a control board -17-, which is conventional per se. The control cabinet -15- is arranged beside a staircase -16- mounted inside the tower -2-.

Each beacon light -6- comprises a diffuser lens -6a-mounted on a fitting -6b-that is mounted on the wall -2a-of the tower -2-. The fitting -6b-comprises a rear tubular extension -6c-that traverses the wall -2a-. The optical fibers -8a-are secured inside the rear tubular extension -6c-such that their light outlet ends are in contact with the diffuser lens -6a-.

Although the present invention has been disclosed in the form of preferred embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements. The mention of a "unit" or a "module" does not preclude the use of more than one unit or module.

The invention claimed is:

1. A beacon illumination device for signaling, to aircraft, the presence of a wind turbine with a tower, a nacelle mounted on an upper part of the tower, a hub on which is mounted at least one blade, and an electrical machine connected to the hub and housed in the nacelle, which comprises
   an illuminator device that includes at least one light-emitting diode capable of being arranged in an interior part of the wind turbine,
   at least one beacon light capable of being mounted at an end part of the wind turbine in a position at a distance from the illuminator device,
   at least one light conductor that includes optical fibers for transmitting light from the illuminator device to the beacon light, the illuminator device facing light inlet ends of the optical fibers and each optical fiber comprising a light outlet end,
   wherein the optical fibers are grouped in at least one bundle of optical fibers, wherein the illuminator device further includes an optical collimator that includes at least one collimator lens for converting scattered light emitted by the light-emitting diode into a parallel light beam and transmitting same toward the light inlet ends of the optical fibers, wherein the at least one collimator lens is arranged between the light inlet ends of the optical fibers and a concave reflector, wherein the concave reflector directs the scattered light emitted by the light-emitting diode toward the collimator lens, wherein the concave reflector is arranged between the at least one collimator lens and the light emitting diode, and
   wherein the collimator lens, concave reflector, and inlet of the optical fibers are arranged such that the scattered light emitted by the light-emitting diode is directed from the concave reflector directly to the collimator lens, and directly from the collimator lens to the inlet of the optical fibers.

2. The device as claimed in claim 1, wherein the beacon light comprises an optical diffuser arranged at the light outlet end of the optical fibers of the bundle of optical fibers.

3. The device as claimed in claim 2, wherein the optical diffuser comprises a diffuser optical lens.

4. The device as claimed in claim 1, wherein the bundle of optical fibers includes a principal trunk and at least one branch deriving from the principal trunk, wherein the at least one branch includes at least one optical fiber originating from the principal trunk, and wherein the light outlet ends of the optical fibers of the principal trunk and of the at least one branch are connected to respective beacon lights.

5. The device as claimed in claim 1, wherein the illuminator device includes a plurality of light-emitting diodes.

6. The device as claimed in claim 5, wherein the concave reflector directs the scattered light emitted by the plurality of light-emitting diodes toward the collimator lens of the optical collimator.

7. A wind turbine including:
   a tower,
   a nacelle mounted on an upper part of the tower,
   a hub on which is mounted the at least one blade, and
   an electrical machine connected to the hub and housed in the nacelle,
   wherein the wind turbine includes at least one beacon illumination device according to claim 1.

8. The wind turbine as claimed in claim 7, wherein the at least one blade includes a root that is connected to the hub, a tip, a leading edge, a trailing edge and a shell that constitutes an exterior covering of the blade, wherein the wind turbine includes at least one beacon light in an end part of the at least one blade, close to the tip of the at least one blade, wherein the at least one beacon light is connected to at least one illuminator device arranged inside the hub by respective bundles of optical fibers such that the at least one beacon light turns with the hub, and wherein each bundle of optical fibers extends internally through the at least one blade such that the light outlet ends of the optical fibers are in contact with a part of the beacon light.

9. The wind turbine as claimed in claim 8, wherein the at least one beacon light is connected via the bundle of optical fibers to a single illuminator device.

10. The wind turbine as claimed in claim 8, wherein the at least one blade includes a principal beam that extends between the root and the tip of the blade;

the principal beam includes a front wall facing the leading edge of the blade;

on the front wall of the principal beam is arranged a guide profile that guides the bundle of optical fibers toward the beacon light.

11. The wind turbine as claimed in claim 8, wherein the beacon light includes a diffuser lens mounted on a fitting that is mounted on the shell of the at least one blade;

the fitting includes a rear tubular extension that traverses the shell;

the optical fibers are secured inside the rear tubular extension such that their light outlet ends are in contact with the diffuser lens.

12. The wind turbine as claimed in claim 8, wherein the beacon light includes a light diffuser cover arranged, in a zone of the tip of the blade, externally on the shell;

the optical fibers traverse the shell of the blade toward the exterior and are embedded in a resin layer applied between the shell and the light diffuser cover such that the light outlet ends of the optical fibers are in contact with the light diffuser cover, forming points of light that are diffused by the light diffuser cover.

13. The wind turbine as claimed in claim 8, wherein the shell of the at least one blade includes a transparent part in a part of the tip of the blade;

the outlet ends of the optical fibers of the bundle of optical fibers are connected to an optical diffuser positioned inside the blade such that the light exiting the optical diffuser is projected to the exterior of the blade via the transparent part.

14. The wind turbine as claimed in claim 7, including a plurality of beacon lights distanced from one another over the periphery of the tower of the wind turbine and connected by respective bundles of optical fibers to at least one illuminator device.

15. The wind turbine as claimed in claim 14, wherein each beacon light is connected via the bundle of optical fibers to a single illuminator device.

16. The wind turbine as claimed in claim 14, wherein each beacon light includes a diffuser lens mounted on a fitting that is mounted on the wall of the tower;

the fitting includes a rear tubular extension that traverses the wall;

the optical fibers are secured inside the rear tubular extension such that their light outlet ends are in contact with the diffuser lens.

\* \* \* \* \*